United States Patent Office 3,475,593
Patented Oct. 28, 1969

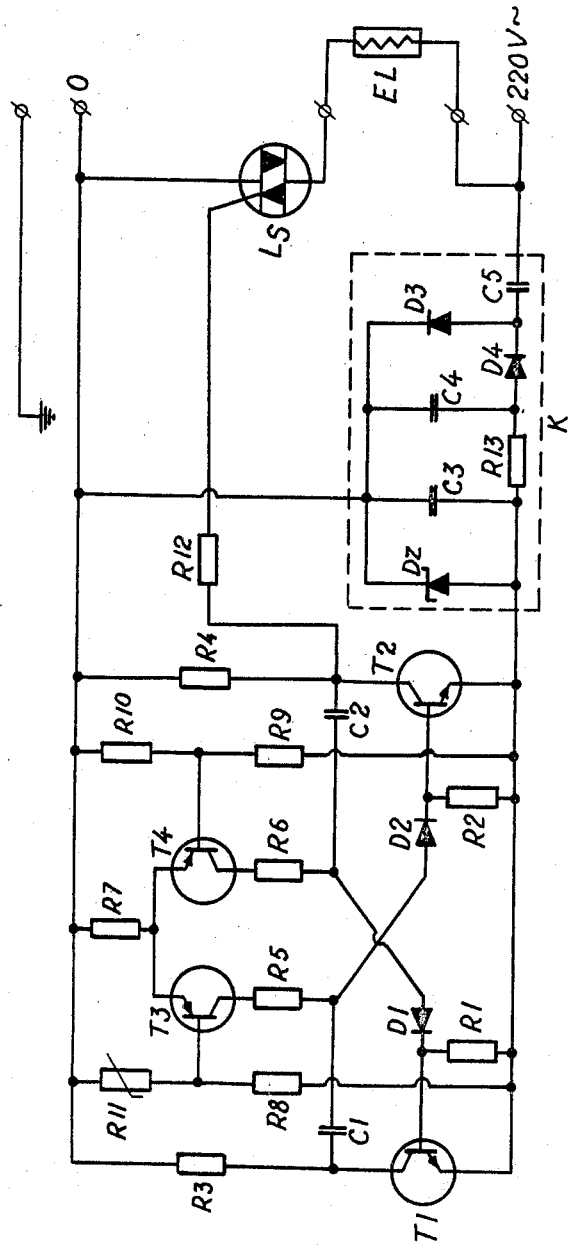

3,475,593
METHOD AND ARRANGEMENT FOR PERIODICALLY CONNECTING AND DISCONNECTING A HEATING UNIT
Erik Herbert Olofsson, Skarholmen, and Borje Sixten Arnrup, Sundbyberg, Sweden, assignors to Billman-Regulator AB, Huddinge, Sweden, a company of Sweden
Filed Apr. 11, 1967, Ser. No. 629,946
Claims priority, application Sweden, Apr. 14, 1966, 5,123/66
Int. Cl. H05b 1/02
U.S. Cl. 219—501      14 Claims

ABSTRACT OF THE DISCLOSURE

The control of electric heaters by thermostats is replaced by pulse control derived from a multivibrator. The unbalance of a temperature-sensing bridge is amplified and supplied to the multivibrator so as to vary the on-off-ratio of two transistors forming part of the multivibrator. The output of one of said transistors controls an electronic switch, preferably a symmetrical controlled rectifier, connecting and disconnecting the heater current.

---

The present invention relates to a method and an arrangement for the control of room heating and is concerned particularly with the problem of connecting and disconnecting a heater periodically.

Usually the control of the electric heating of dwellings or similar is performed by means of a thermostat which senses the room temperature, connects the heater at a certain minimum temperature and disconnects the same when a certain maximum temperature is exceeded. With such a control the periods of connection and disconnection are so long that the heater cools off considerably during the periods of disconnection and then must be heated again to a considerably higher temperature. In some common types of heaters (heating panels or similar) said temperature fluctuations give rise to very disturbing sharp clicks, particularly during the cooling-off periods. With thermostats of the bimetallic type a further problem is their restricted life due to wear of the contacts and also sometimes the requirement of elimination of radio frequency disturbances caused by the disconnection sparks.

The object of the present invention is to eliminate the above-mentioned drawbacks of electric heating plants and to effect a smoother power control and a less fluctuating temperature of the electric heaters, whereby an even temperature is obtained in the temperature-controlled room and the above-mentioned noise due to thermic stresses in the heaters is eliminated.

In principle the invention consists in that the heater is controlled by an oscillator having a cyclic period short in comparison to the thermic time constant of the heater and in which the ratio of the on- to the off-parts of said period is influenced by the room temperature.

The arrangement for practising said method comprises an oscillator of the multivibrator type, in which the ratio of the on- to the off-parts of the cyclic period is controllable by a differential amplifier connected to a bridge having a temperature-sensing branch located in the heated room, the output of said oscillator controlling an electronic switch in the feed circuit of the heater.

The invention will now be more closely described with reference to the accompanying drawing showing a preferred embodiment of the invention.

The figure shows a multivibrator comprising two transistors T1 and T2 of the n-p-n-type, the base and collector electrodes of which are cross-connected by condensers C1, C2 and diodes D1, D2. The object of the diodes is to protect the base-collector-junctions against excess voltages. Furthermore, in each transistor the base and emitter electrodes are connected to each other via a resistor R1 and R2, respectively, and the emitters are also connected to a D.C. supply source K. The collector electrodes of the transistors are connected to ground via resistors R3 and R4.

A differential amplifier comprising two transistors T3, T4 is connected between ground and the base-collector circuits of the multivibrator, the collector electrodes of the transistors T3, T4 being connected via collector resistors R5, R6 to the points of connection of C1 to D2 and of C2 to D1, respectively, of the multivibrator, and the emitters of the transistors T3, T4 being grounded in common via a resistor R7. The base inputs of the differential amplifier are connected to one pair of diagonal points of a bridge comprising three fixed resistors R8, R9, R10 and a temperature-sensitive resistor, preferably a thermistor R11. The other pair of diagonal points of the bridge is connected to the terminals of 220 volts A.C. network, one terminal of which is grounded.

An electronic switch consisting of a symmetrical controlled rectifier $L_s$ is connected in series with the electric heater EL to the mains, and the controlling electrode of said rectifier is connected via a resistor R12 to the collector of transistor T2 forming part of the multivibrator. The member $L_s$ is an integration of two opposed controlled rectifiers (also termed thyristors) comprising five semiconductive layers with two connected control electrodes. When said electrodes are properly biased, the symmetrical controlled "rectifier" conducts the current in both directions. Such a semiconductor device is sold by General Electric Co. under the trademark Triac.

The direct current required for feed of the multivibrator and the differential amplifier is supplied by the D.C. power unit K which consists of a Zener diode $D_z$, two electrolytic condensers C3, C4, smoothing resistor R13, half-wave rectifiers D3, D4 and a condenser C5, the object of which is to limit the voltage to the value required by the control circuits.

When the mains are connected, the power unit K supplies a D.C. voltage which by choosing a proper size of the condenser C5 is made suitably high for the operation of the oscillator and the differential amplifier. The bridge which also is fed by the power unit K, comprises the temperature-sensitive member R11 that senses the temperature of the heated room. Changes of the bridge balance due to fluctuations of the room temperature affect the differential amplifier which is connected to the multivibrator-oscillator. The cyclic period of the multivibrator which preferably is of the order of 1.5 to 3 minutes, is maintained substantially constant, but the differential amplifier influences the division of said period into on- and off-parts, as observed at one of the outputs, e.g. at the collector of transistor T2. The output of transistor T2 is connected to the symmetrical controlled rectifier $L_s$ and controls its switching operation, so the the period of connection of the electric heater EL corresponds to the duration of the on-state of transistor T2 and its period of disconnection to the duration of the off-state of transistor T2. The described control, i.e. pulse-ratio control, is continuous, so that the temperature fluctuations of the heater will be quite small and the thermal stresses therein not noticeable. However, a provision is that the cycle period of the oscillator is short in comparison to the thermic time constant of the heater. The latter is usually of the order of 10 to 30 minutes, and then an oscillation period of the multivibrator of the order of 1.5 to 3 minutes gives a satisfactory heat control and at the same time reduces the number of switching operations to a minimum, and as the switching takes place at zero voltage the power network is not disturbed. The on-off-ratio of the transistors of the multivibrator can be varied within wide limits while the constant total period of oscillation is maintained constant, and therefore with the mentioned frequency of switching the heater in and out, its heating capacity can be varied from substantially zero to substantially 100 percent.

Although the invention has been described with reference to the shown embodiment, of course it is not restricted thereto, but modifications of the various parts of the control circuit as to details thereof are comprised in the scope of the invention. Thus for instance, the symmetrical controlled rectifier which when properly biased, conducts in both directions, may be replaced by two ordinary controlled rectifiers or by one ordinary controlled rectifier or a transistor in combination with a rectifier bridge. In all these alternatives the electronic switch consists of a controllable solid-state semiconductor device operating instantaneously at the zero passages of the A.C. voltage of the feeding current source.

We claim:
1. Apparatus for controlling the supply of electrical energy from a source of electrical energy to a heater comprising:
   means including a multivibrator oscillator for producing an electrical periodic signal having a period comprised of a first time portion, during which energy is supplied to said heater and a second time portion during which energy is not supplied to said heater, said signal being applied to said heater,
   temperature sensing means, and
   means including a differential amplifier and a bridge circuit having a temperature sensing branch, connected to said producing means and said temperature sensing means for changing the length of said first time portion so that the energy supplied to said heater is a function of the temperature sensed by said temperature sensing means.

2. Apparatus as in claim 1 including switch means connecting said source of energy to said heater and connected to said producing means for receiving said signal so that said switch is not supplying energy to said heater during said second time portion and supplies energy to said heater during said first time portion.

3. Apparatus as in claim 2 wherein said switch is a Triac.

4. Apparatus as in claim 1 wherein said differential amplifier comprises two transistors having a common emitter circuit and base electrodes which are connected to said bridge circuit and the collector electrodes of which are connected to said oscillator.

5. Apparatus as in claim 1 wherein said oscillator comprises a multivibrator having two transistors, the base and collector electrodes of both being connected crosswise via coupling members.

6. Apparatus as in claim 1 including said source of electrical energy and said heater.

7. Apparatus as in claim 1 wherein said period has a length which is small compared to the time constant of said heater.

8. Apparatus as in claim 1 including means for supplying regulated, direct current voltage to said producing and connecting means.

9. Apparatus for periodically connecting and disconnecting a source of electrical energy to a heater comprising,
   switch means connecting said heater to said source of electrical energy for receiving an electrical signal and permitting electrical energy to pass to said heater only when said electrical signal is in a first electrical state,
   a multivibrator oscillator for producing said periodic electrical signal having a period comprised of a first time portion during which said periodic signal is in said first state and a second time portion during which said periodic signal is in a second state,
   means for applying said periodic signal to said switching means,
   temperature sensing means having a resistance which varies as a function of the temperature sensed,
   an electrical bridge comprised of a plurality of resistive elements including said temperature sensing means,
   means for supplying electrical energy to said bridge so that the voltages across said temperature sensing means varies as a function of the temperature sensed by said temperature sensing means,
   a differential amplifier connected to said bridge circuit for producing an electrical amplified signal which varies as a function of temperature sensed by said temperature sensing means, and
   means for receiving said electrical amplified signal produced by said differential amplifier and connected to said multivibrator oscillator for changing the length of said first time portion to thereby change the amount of energy supplied to said heater so that the energy supplied to said heater is a function of the temperature sensed by said temperature sensing means.

10. Apparatus as in claim 9 wherein said switching means includes a Triac.

11. Apparatus as in claim 9 wherein the length of said period is short in comparison to the time constant of said heater.

12. A method of periodically connecting and disconnecting a heater including the steps of:
   producing an electrical signal which is a function of the temperature of the room heated by said heater,
   applying said electrical signal to periodic signal producing means producing an electrical periodic signal having a period comprised of a first time portion and a second time portion so that the length of said first time portion varies as a function of said temperature, and
   applying said electrical periodic signal to a switch means connected between said heater and said source of electrical energy so that said switch permits energy to be supplied to said heater only during said first time portion so that the energy supplied to said heater varies as a function of said temperature.

13. A method as in claim 12 including the steps of applying said electrical signal to a differential amplifier which produces another electrical signal which varies as a function of said temperature and applying said electrical signal to said signal producing means.

14. A method of controlling the energy supplied from a source of electrical energy to a heater comprising the steps of,
   producing a first electrical signal which is a function of the temperature of the room heated by said heater,
   applying said first electrical signal to a differential amplifier which produces a second electrical signal which varies as a function of said temperature,
   applying said second electrical signal to a multivibrator oscillator circuit which produces a periodic electrical signal having a period comprised of a first time portion during which said signal is in a first electrical state and a second time portion during which said electrical periodic signal is in a second electrical state so that the length of said first time portion varies with the temperature of said heater, and applying said periodic signal to the switch means which connects said source of energy to said heater and which permits said energy to be supplied to said heater only when said switch means is receiving an electrical signal in said first state so that the energy supplied to said heater varies as a function of said temperature.

References Cited
UNITED STATES PATENTS

| 2,984,729 | 5/1961 | Hykes et al. | 219—501 |
| 3,040,157 | 6/1962 | Hukee | 219—501 |
| 3,071,676 | 1/1963 | Sandwyk | 219—501 |
| 3,107,285 | 10/1963 | Knapp | 219—501 |
| 3,149,224 | 9/1964 | Horne et al. | 219—501 |
| 3,381,226 | 4/1968 | Jones et al. | 219—501 |

BERNARD A. GILHEANY, Primary Examiner

F. E. BELL, Assistant Examiner